(12) United States Patent
Jeong et al.

(10) Patent No.: US 12,221,164 B2
(45) Date of Patent: Feb. 11, 2025

(54) VEHICLE BODY STRUCTURE

(71) Applicants: Hyundai Motor Company, Seoul (KR); Kia Corporation, Seoul (KR)

(72) Inventors: Seung Min Jeong, Hwaseong-si (KR); Seung Ho Noh, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 304 days.

(21) Appl. No.: 17/978,404

(22) Filed: Nov. 1, 2022

(65) Prior Publication Data

US 2023/0339552 A1 Oct. 26, 2023

(30) Foreign Application Priority Data

Apr. 25, 2022 (KR) ........................ 10-2022-0050715

(51) Int. Cl.
| | | |
|---|---|---|
| *B62D 25/20* | (2006.01) | |
| *B62D 25/02* | (2006.01) | |
| *B62D 25/14* | (2006.01) | |
| *B62D 25/24* | (2006.01) | |
| *B62D 25/04* | (2006.01) | |

(52) U.S. Cl.
CPC ....... *B62D 25/2009* (2013.01); *B62D 25/025* (2013.01); *B62D 25/145* (2013.01); *B62D 25/2018* (2013.01); *B62D 25/2036* (2013.01); *B62D 25/04* (2013.01)

(58) Field of Classification Search
CPC .............. B62D 25/145; B62D 29/3077; B62D 25/2018; B62D 25/2036; B62D 25/2009
See application file for complete search history.

(56) References Cited

U.S. PATENT DOCUMENTS

| | | | |
|---|---|---|---|
| 2004/0145216 A1* | 7/2004 | Kuroda .................... | B60G 7/02 296/203.02 |
| 2019/0023321 A1* | 1/2019 | Ayukawa ................ | B62D 21/03 |
| 2019/0225272 A1* | 7/2019 | Yoshida ................ | B62D 21/152 |
| 2021/0009206 A1 | 1/2021 | Okamoto et al. | |

FOREIGN PATENT DOCUMENTS

| | | |
|---|---|---|
| JP | 2013203237 A | 10/2013 |
| KR | 101209935 B1 | 12/2012 |
| KR | 20130068961 A | 6/2013 |
| KR | 101295087 B1 | 8/2013 |
| KR | 20140024602 A | 3/2014 |
| KR | 101795396 B1 | 12/2017 |
| KR | 101896704 B1 | 9/2018 |
| KR | 20210130883 A | 11/2021 |

* cited by examiner

*Primary Examiner* — Daniel J Colilla
(74) *Attorney, Agent, or Firm* — Slater Matsil, LLP

(57) ABSTRACT

In an embodiment, a vehicle body structure includes a dash cross member disposed on an upper surface of a dash floor in a lateral direction of a vehicle. A lower side member is coupled to a lower side of the dash floor to face the dash cross member and coupled to a side wall of a side sill. A body mounting bracket is provided under the lower side member and coupled to a frame.

20 Claims, 6 Drawing Sheets

VEHICLE BODY STRUCTURE

CROSS-REFERENCE TO RELATED APPLICATIONS

The present application claims priority to Korean Patent Application No. 10-2022-0050715, filed Apr. 25, 2022, the entire contents of which is incorporated herein for all purposes by this reference.

TECHNICAL FIELD

The present disclosure relates to a technology for coupling a frame to a body in a vehicle body structure.

BACKGROUND

A purpose built vehicle (PBV) is a vehicle that includes a drive module relating to the driving of the vehicle and a life module forming various types of boarding and loading spaces according to market demands to meet the market trend of high-mix low-volume production.

The life module includes a vehicle body shaped to meet a specific goal according to market demand.

Accordingly, there is an advantage in that just a change of the life module allows the swift production of a vehicle that meets the market demand.

In addition, the recent trend in pursuing eco-friendly vehicle technology spurs the development of the drive module in the direction of mounting a high-voltage battery in a frame.

Accordingly, the PBV may be produced by coupling a vehicle body shaped to serve the purpose of the vehicle to a frame provided with a high-voltage battery.

A PBV tends to have a very short front overhang and place a boarding space toward the front of a vehicle to promote the marketability of the interior space of the life module such that the space for absorbing collision energy in the event of a front collision of the vehicle is reduced, making it difficult to ensure collision performance. And mounting of a high-load high-voltage battery in the drive module applies a large load to a mounting portion between the vehicle body and the frame, making it difficult to ensure rigidity.

The matters described as background are intended only for a better understanding of the background of the present invention and are not to be taken as acknowledgment that they meet the legal definition of prior art.

SUMMARY

Embodiments of the present invention can provide a vehicle body structure configured to secure sufficient rigidity against a front collision of the vehicle and substantially improve the rigidity of a frame supporting a high-load high-voltage battery and a mounting portion of the vehicle so that the collision performance, durability performance, and noise vibration harshness (NVH) of the vehicle may be maximized.

According to embodiments of the present invention, a vehicle body structure includes a dash cross member disposed on an upper surface of a dash floor in the lateral direction of the vehicle body, a lower side member coupled to a lower surface of the dash floor to face the dash cross member and coupled to a side wall of a side sill, and a body mounting bracket provided under the lower side member and coupled to a frame.

A mounting bolt protruding downward to be inserted into the frame may be fixed to the body mounting bracket and the lower side member.

An upper surface of the dash floor above the body mounting bracket and the lower side member may be provided with a dash lower cross extension extending in the lateral direction of the vehicle body.

An inboard end portion of the dash lower cross extension may be coupled to a dash lower side member disposed away from the center to a side of the vehicle body to extend in the front/rear direction of a vehicle body, and an outboard end portion of the dash lower cross extension may be coupled to an A-pillar.

The dash lower side member may extend along the curve of the dash floor in the front/rear direction, a front of the dash lower side member may be coupled to the dash cross member, and a dash upper side member extending rearward from the rear of the front side member toward the dash lower side member to be coupled to the dash cross member may be provided in front of the dash cross member to which the dash lower side member is coupled so as to transfer force to be transferred rearward from the front side member to the dash lower side member.

The lower side member may extend outward to the rear of the vehicle body to be coupled to a side wall of the side sill while a front-end portion faces the lower side of a portion where the dash cross member, the dash upper side member, and the dash lower side member meet.

The lower side member may form, together with the dash lower cross extension and the dash lower side member, a triangle, a vertex of which is connected to the side sill.

Either end of the dash cross member may be coupled to the A-pillar on either side of the vehicle body.

The rear of the dash floor may be connected to a body floor, a lower surface of the body floor may be provided with a center cross member connecting the sides sills on either side of the vehicle body in the rear of the lower side member, and a rear-end portion of the dash lower side member may be coupled to an upper surface of the body floor to face the center cross member.

The side sill may be provided with a reinforcing member extending in the length direction of the vehicle body, a connecting bracket connecting the side wall of the side sill to the reinforcing member may be provided on the reinforcing member, and a body mounting bracket may be coupled to the side wall of the side sill to face the connecting bracket.

In addition, according to embodiments of the present invention, a vehicle body structure includes a dash cross member extending in the lateral direction of the vehicle body to be coupled to the upper surface of the dash floor and connect A-pillars on either side of the vehicle body, dash upper side members and dash lower side members that are respectively spaced apart from each other on either side across the center of the vehicle body to extend along a curve of the dash floor in the front/rear direction on an upper surface of the dash floor and that are coupled to the dash cross member and a lower side member having a front portion coupled to a portion of the dash floor across from the portion where the dash cross member, the dash upper side member, and the dash lower side member meet and a rear portion coupled to a side wall of a side sill.

A front side member may be provided in front of the dash upper side member such that the force acting rearward through the front side member may be transferred to the dash lower side member through the dash upper side member.

A body mounting bracket coupled to a frame may be provided between the lower side of the lower side member and the side wall of the side sill.

The side sill may be provided with a reinforcing member extending in the front/rear direction of the vehicle body, a connecting bracket may be provided between the upper side of the reinforcing member and the side wall of the side sill, and the body mounting bracket may be connected to the side wall of the side sill to face the connecting bracket.

The upper surface of the dash floor above the body mounting bracket and the lower side member may be provided with a dash lower cross extension connecting the A-pillar and the dash lower side member in the lateral direction of the vehicle body.

The dash lower cross extension, the dash lower side member, and the lower side member may form a triangle with each other.

A center cross member extending in the lateral direction of the vehicle body to connect the side sills on either side may be coupled to a lower surface of the body floor extending rearward from the dash floor in the rear of the lower side member, and a rear-end portion of the dash lower side member may be coupled to an upper surface of the body floor to face the center cross member.

Embodiments of the present invention can provide a vehicle body structure configured to ensure sufficient rigidity against the front collision of the vehicle and substantially improve the rigidity of a frame supporting a heavy high-voltage battery and a mounting portion of the vehicle body so that that the collision performance, durability performance, and noise vibration harshness (NVH) of the vehicle may be maximized.

DETAILED DESCRIPTION OF ILLUSTRATIVE EMBODIMENTS

Figure 1:
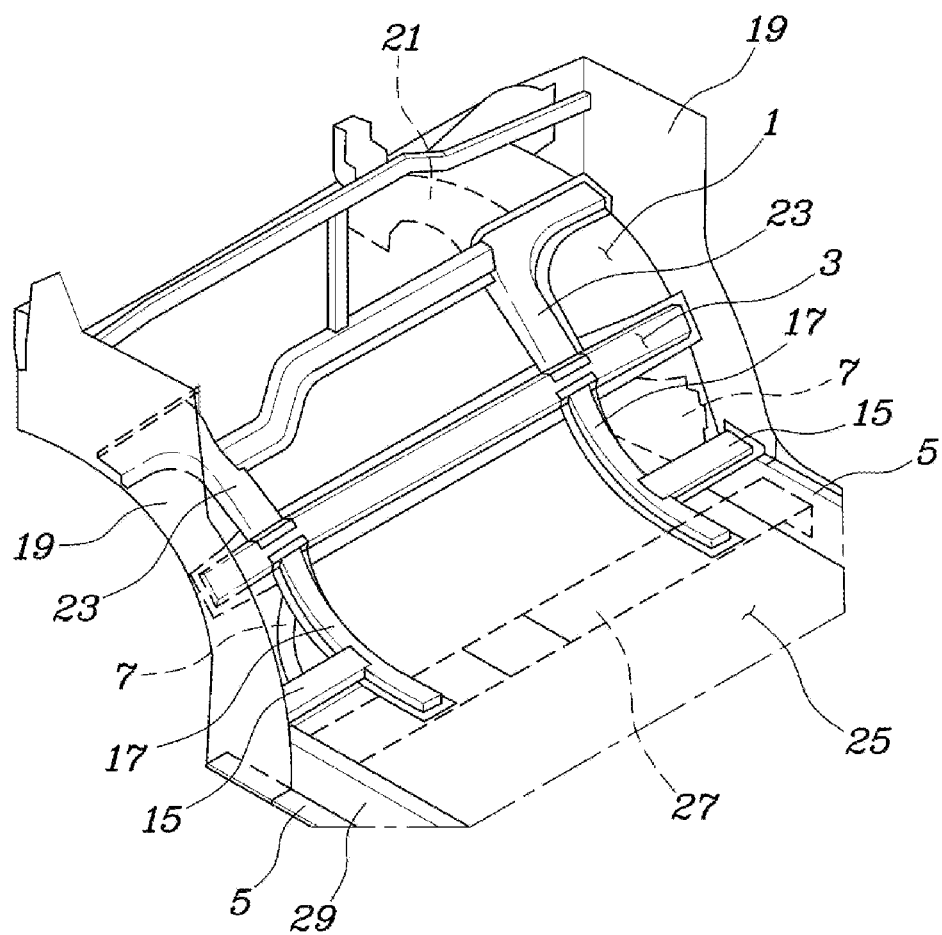
FIG. 1 is a view illustrating a vehicle body structure viewed from the upper side of a dash floor according to embodiments the present invention.

The specific structural or functional descriptions of the embodiments disclosed in the present specification or application are merely exemplified for the purpose of describing the embodiments according to the present invention. The embodiments of the present invention may be implemented in various forms, and the present invention is not to be interpreted as being limited to the embodiments described in the present specification or application.

The embodiment according to the present invention may be subject to various modifications and have various forms so that specific embodiments will be illustrated in the drawings and described in detail in the present specification or application. It is to be understood that this is not intended to limit the embodiments according to the concept of the present invention to the specific disclosed forms and that all modifications, equivalents, and substitutes within the spirit and technical scope of the present invention are included.

Terms such as first, second, etc. may be used to describe various components, but the components are not to be limited by the terms. The terms may only be used for the purpose of distinguishing one component from another. For example, without departing from the scope of the present invention, a first component may be denoted as a second component, and similarly, a second component may also be denoted as a first component.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present. Other expressions describing a relationship between components, that is, "between", "just between", "neighboring", and "directly neighboring" are to be interpreted in the same manner.

The terms used herein are used for the purpose of describing specific embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts or combinations thereof in advance.

Unless otherwise defined, all terms used herein, including technical or scientific terms, may have the same meanings as are generally understood by those skilled in the art to which the present invention pertains. The terms such as those defined in commonly used dictionaries are to be interpreted as having meanings consistent with their meanings in the context of the related technology and are not to be interpreted in an idealized or overly formal sense unless expressly so defined herein.

Hereinafter, the present invention will be described in detail by describing the preferred embodiments of the present invention with reference to the accompanying drawings. The same reference numerals presented in each drawing refer to the same members.

FIGS. 1 to 6 show that, according to an embodiment of the present invention, a vehicle body structure includes a dash cross member 3 disposed on an upper surface of a dash floor 1 in the lateral direction of the vehicle, a lower side member 7 coupled to a lower surface of the dash floor 1 to face the dash cross member 3 and coupled to a side wall of a side sill 5, and a body mounting bracket 11 provided under the lower side member 7 and coupled to the frame 9.

That is, according to this embodiment invention, the dash cross member 3 and the lower side member 7 are respectively coupled to the upper and lower surfaces of the dash floor 1, a front-end portion of the lower side member 7 facing the dash cross member 3 across the dash floor 1, and a rear of the lower side member 7 is coupled to the side sill 5 so that a structure configured to solidly support the body mounting bracket 11 is formed.

Figure 2:
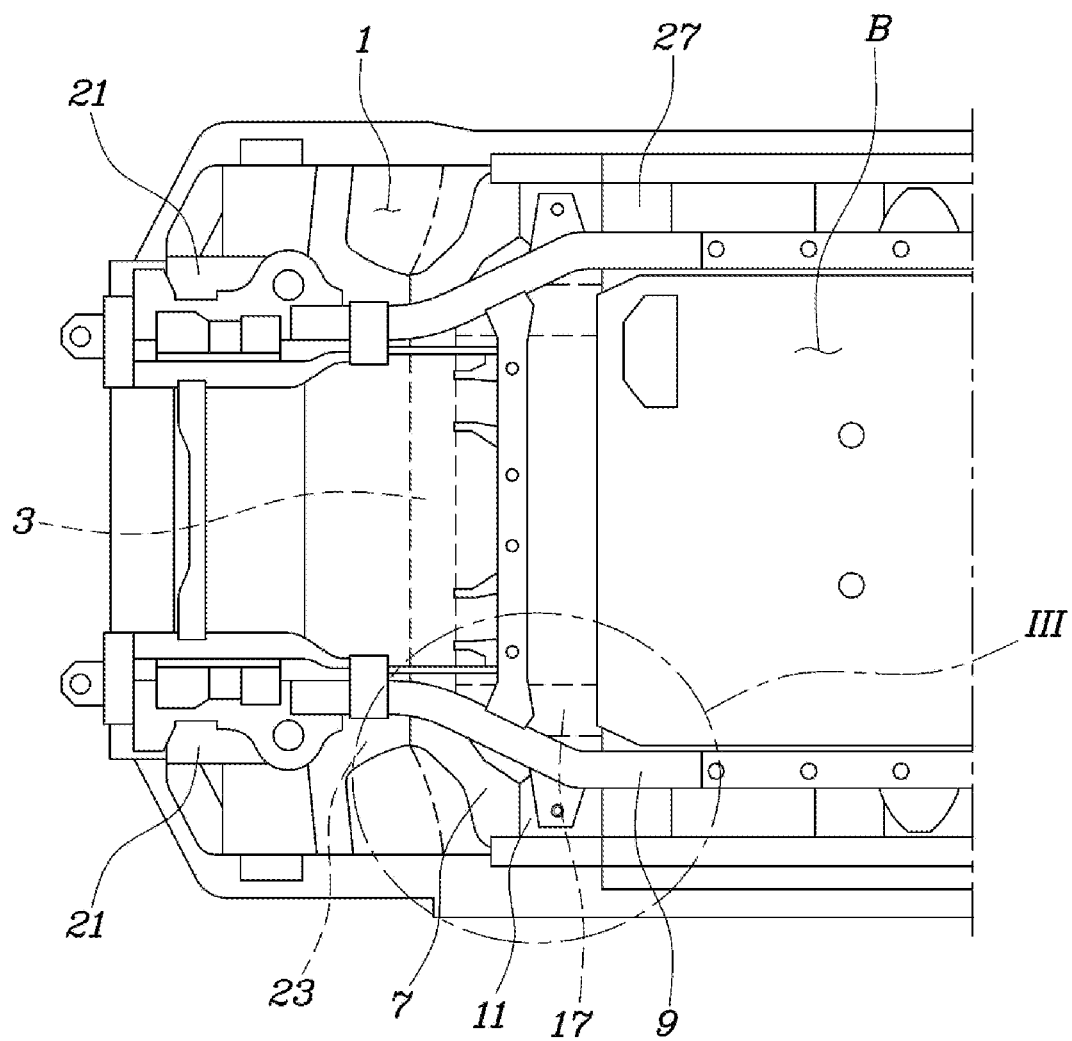
FIG. 2 is a view illustrating a state in which a frame is coupled to a lower side of a vehicle body viewed from below.
Figure 3:
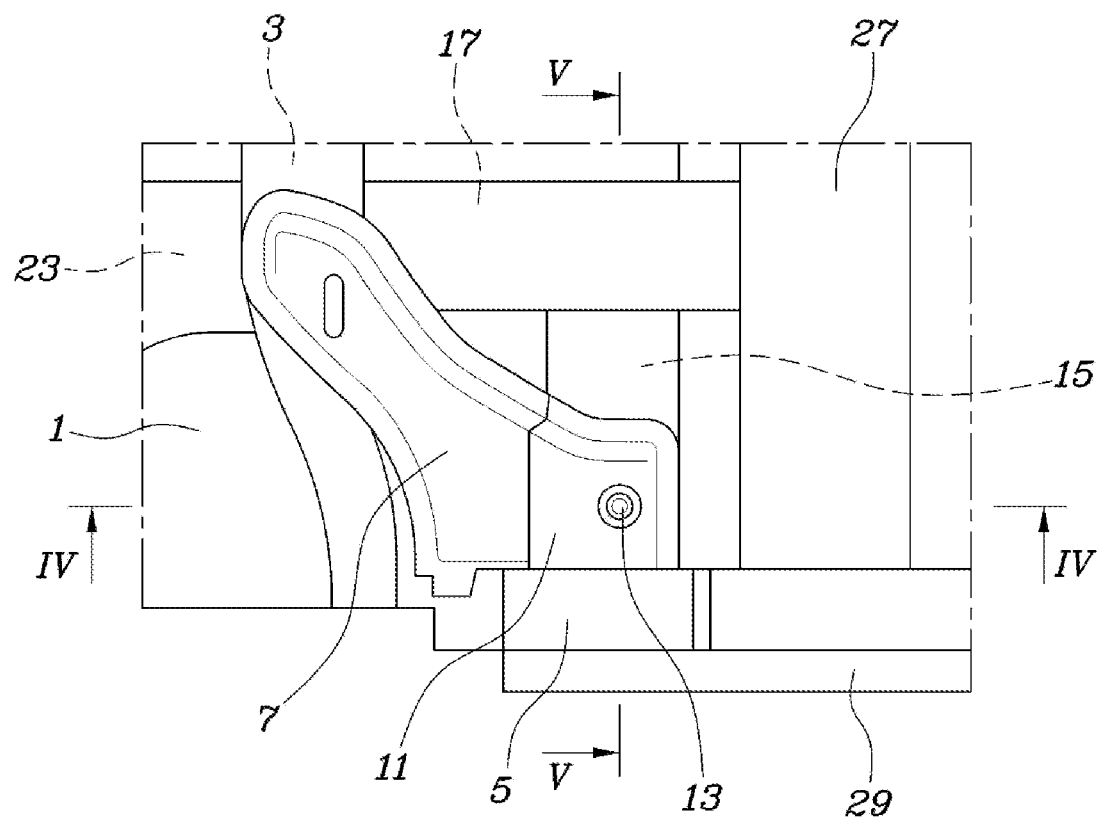
FIG. 3 is an enlarged view of III in FIG. 2 minus the frame.
Figure 4:
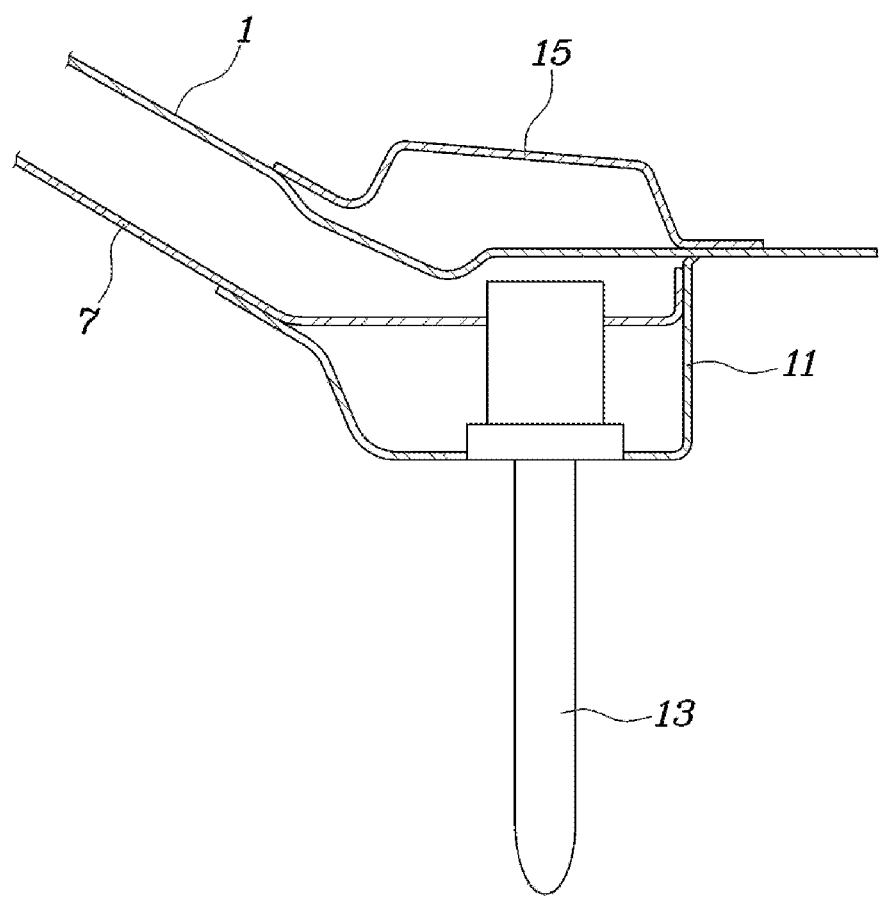
FIG. 4 is an enlarged cross-sectional view of III taken along the line Iv-Iv in FIG. 3.
Figure 5:
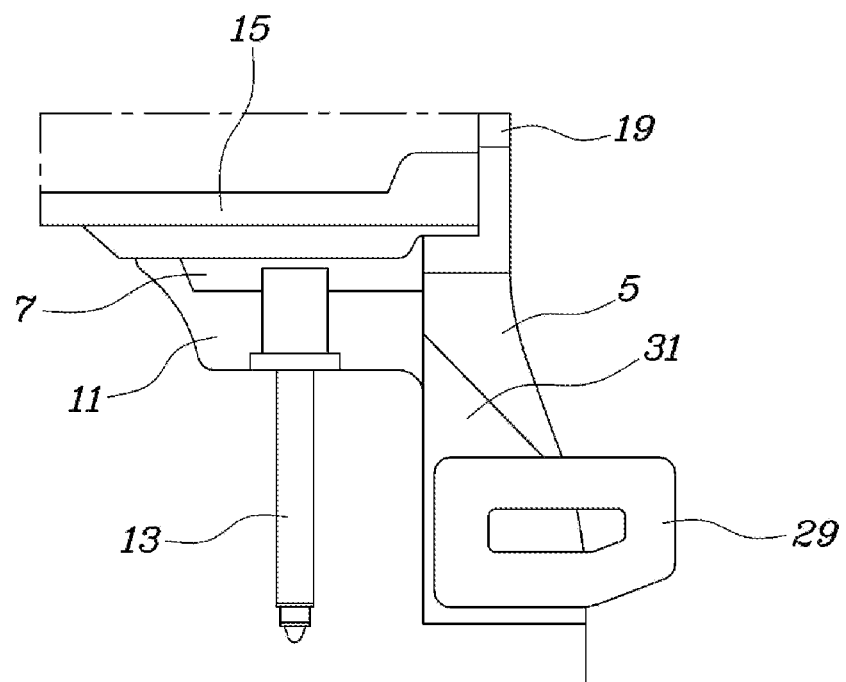
FIG. 5 is an enlarged cross-sectional view of III taken along the line V-V in FIG. 3.
Figure 6:
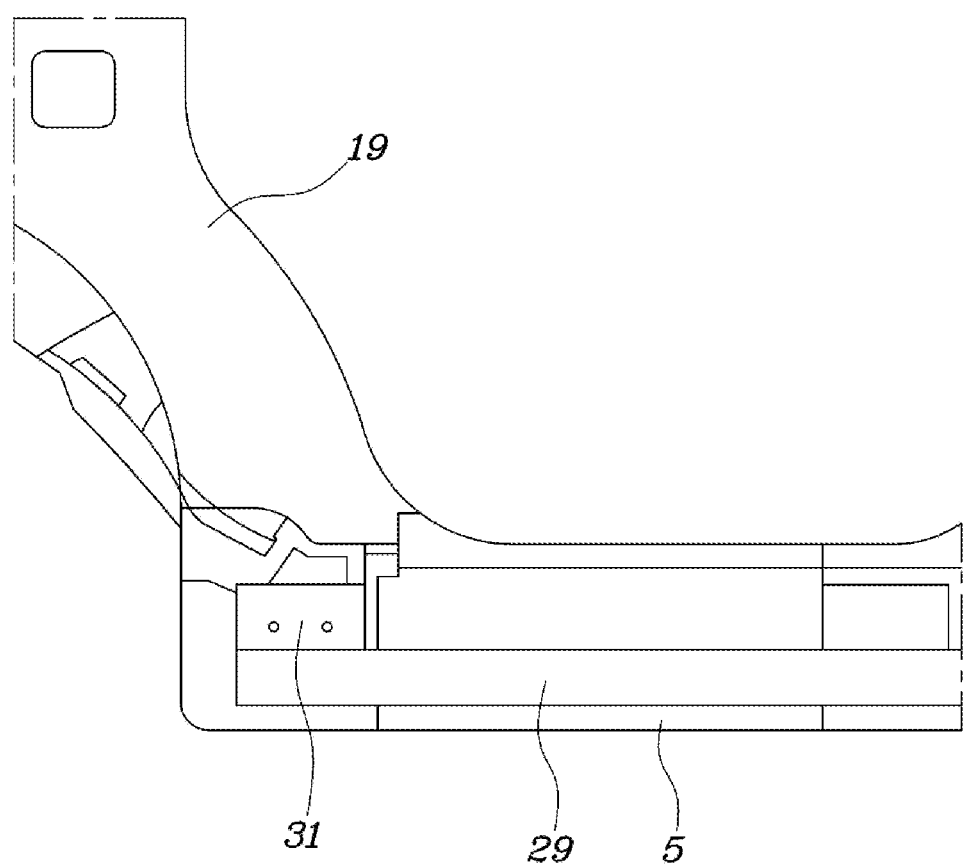
FIG. 6 is a right-side view of the enlarged cross-sectional view of III in FIG. 5.

It is to be noted that a high voltage battery B is mounted in the frame 9 in FIG. 2.

A mounting bolt 13 protruding downward to be inserted into the frame 9 is fixed to the body mounting bracket 11 and the lower side member 7.

Accordingly, when the frame 9 and the vehicle body are coupled to each other, the mounting bolt 13 is inserted into a mounting hole formed in the frame 9 to facilitate the exact and solid assembly.

An upper surface of the dash floor above the body mounting bracket 11 and the lower side member 7 may be provided with a dash lower cross extension 15 extending in the lateral direction of the vehicle body.

That is, the dash floor 1 and the dash lower cross extension 15 sequentially overlap above the lower side member 7, and the body mounting bracket 11 is coupled to the lower side of the lower side member 7.

An inboard end portion of the dash lower cross extension 15 is coupled to a dash lower side member 17 disposed away from the center to a side of the vehicle body to extend in the front/rear direction of a vehicle body, and an outboard end portion of the dash lower cross extension 15 is coupled to an A-pillar 19.

Accordingly, the body mounting bracket 11 is mounted based on the robust support structure provided by the dash lower cross extension 15 and the lower side member 7 described above so that more a robust support structure may be ensured.

The dash lower side member 17 extends along the curve of the dash floor 1 in the front/rear direction, a front of the dash lower side member 17 is coupled to the dash cross member 3, and a dash upper side member 23 extending rearward from a rear of a front side member 21 toward the dash lower side member 17 to be coupled to the dash cross member 3o is provided in front of the dash cross member 3 to which the dash lower side member 17 is coupled so as to transfer force to be transferred from the rear of the front side member 21 to the dash lower side member 17.

Accordingly, in the event of a collision, the impact force transferred rearward from the front side member 21 is transferred in dispersion to and borne by the dash upper side member 23, the dash cross member 3, and the dash lower side member 17 so that sufficient front collision performance of the vehicle may be ensured.

Here, the lower side member 7 extends outward to the rear of the vehicle body to be coupled to a side wall of the side sill 5 while the front-end portion faces the lower side of a portion where the dash cross member 3, the dash upper side member 23, and the dash lower side member 17 meet such that the impact force transferred from the front side member 21 may be dispersed and borne so that the front collision performance of the vehicle may be further improved.

In particular, the lower side member 7 forms, together with the dash lower cross extension 15 and the dash lower side member 17, a triangle, a vertex of which is connected to the side sill 5, so that the structural stability for solidly bearing the load transferred from the front side member 21 to dash cross member 3 through the dash upper side member 23 is ensured.

In addition, either end of the dash cross member 3 is coupled to the A-pillar 19 on either side of the vehicle body so that solid rigidity of the vehicle body may be ensured.

In addition, the rear of the dash floor 1 is connected to a body floor 25, the lower surface of the body floor 25 is provided with a center cross member 27 connecting the side sills 5 on either side of the vehicle body in the rear of the lower side member 7, and a rear-end portion of the dash lower side member 17 is coupled to the upper surface of the body floor 25 to face the center cross member 27.

Accordingly, the impact force transferred rearward from the front side member 21 passes through the dash upper side member 23, the dash cross member 3, and the dash lower side member 17 to be also borne by the center cross member 27 so that the front collision performance of the vehicle may be improved.

It is to be noted that the body floor 25 may integrally extend rearward from the dash floor 1 or may be separately provided.

On the other hand, the side sill 5 is provided with a reinforcing member 29 extending in the length direction of the vehicle body, a connecting bracket 31 connecting a side wall of the side sill 5 and the reinforcing member 29 may be provided on the reinforcing member 29, and the body mounting bracket 11 is coupled to the side wall of the side sill 5 to face the connecting bracket 31.

Accordingly, the bearing structure of the body mounting bracket 11 is further solidified, and the impact force transferred rearward through the lower side member 7 may be dispersed through the side sill 5 and the reinforcing member 29.

The present invention as described above may be differently described in the following manner.

That is, according to an embodiment of the present invention, a vehicle body includes a dash cross member 3 extending in the lateral direction of the vehicle body to be coupled to an upper surface of a dash floor 1 and connect A-pillars 19 on either side of the vehicle, dash upper side members 23 and dash lower side members 17 that are respectively spaced apart from each other on either side across the center of the vehicle body to extend along the curve of the dash floor 1 in the front/rear direction on the upper surface of the dash floor 1 and that are coupled to the dash cross member 3, and a lower side member 7 having a front portion coupled to a portion of the dash floor 1 across from the portion where the dash cross member 3, the dash upper side member 23, and the dash lower side member 17 meet and a rear-end portion coupled to a side wall of a side sill 5.

A front side member 21 may be provided in front of the dash upper side member 23 such that the force acting rearward through the front side member 21 may be transferred to the dash lower side member 17 through the dash upper side member 23.

A body mounting bracket 11 coupled to the frame 9 may be provided between the lower side of the lower side member 7 and the side wall of the side sill 5.

The side sill 5 may be provided with a reinforcing member 29 extending in the front/rear direction of the vehicle body, a connecting bracket 31 may be provided between the upper side of the reinforcing member 29 and the side wall of the side sill 5, and the body mounting bracket 11 may be coupled to the side wall of the side sill 5 to face the connecting bracket 31.

An upper surface of the dash floor 1 above the body mounting bracket 11 and the lower side member 7 may be provided with a dash lower cross extension 15 connecting the A-pillar 19 and the dash lower side member 17 in the lateral direction of the vehicle body.

The dash lower cross extension 15, the dash lower side member 17, and the lower side member 7 form a triangle with each other.

A center cross member 27 extending in the lateral direction of the vehicle body to connect the side sills 5 on either side is coupled to a lower surface of a body floor 25 extending rearward from the dash floor 1 in the rear of the lower side member 7, and a rear-end portion of the dash lower side member 17 is coupled to an upper surface of the body floor 25 to face the center cross member 27.

Specific embodiments of the present invention are illustrated and described, but it will be obvious to those skilled in the art that the present invention may be improved upon and modified in various manners without deviating from the technical spirit of the present invention provided in the following claims.

What is claimed is:

1. A vehicle body structure comprising:
a dash cross member disposed on an upper surface of a dash floor in a lateral direction of a vehicle;
a lower side member coupled to a lower side of the dash floor to face the dash cross member and coupled to a side wall of a side sill; and
a body mounting bracket provided under the lower side member and coupled to a frame.

2. The vehicle body structure of claim 1, further comprising a mounting bolt protruding downward to be inserted into the frame and fixed to the body mounting bracket and the lower side member.

3. The vehicle body structure of claim 1, further comprising a dash lower cross extension extending in the lateral direction of the vehicle at the upper surface of the dash floor above the body mounting bracket and the lower side member.

4. The vehicle body structure of claim 3, wherein an inboard end portion of the dash lower cross extension is coupled to a dash lower side member disposed away from the center to a side of the vehicle body to extend in a front/rear direction of the vehicle body, and an outboard end portion of the dash lower cross extension is coupled to an A-pillar.

5. The vehicle body structure of claim 4, wherein:
the dash lower side member extends along a curve of the dash floor in the front/rear direction;
a front of the dash lower side member is coupled to the dash cross member; and
a dash upper side member extending rearward from a rear of a front side member toward the dash lower side member to be coupled to the dash cross member is provided in front of the dash cross member to which the dash lower side member is coupled so as to transfer force to be transferred rearward from the front side member to the dash lower side member.

6. The vehicle body structure of claim 5, wherein the lower side member extends outward to a rear of the vehicle body to be coupled to the side wall of the side sill while a front-end portion of the lower side member faces the lower side of a portion where the dash cross member, the dash upper side member, and the dash lower side member meet.

7. The vehicle body structure of claim 6, wherein the lower side member, the dash lower cross extension and the dash lower side member form a triangle, a vertex of the triangle being connected to the side sill.

8. The vehicle body structure of claim 6, wherein either end of the dash cross member is coupled to the A-pillar on either side of the vehicle body.

9. The vehicle body structure of claim 6, wherein
a rear of the dash floor is connected to a body floor;
a lower surface of the body floor is provided with a center cross member connecting side sills on either side of the vehicle body in a rear of the lower side member; and
a rear-end portion of the dash lower side member is coupled to an upper surface of the body floor to face the center cross member.

10. The vehicle body structure of claim 3, wherein
the side sill is provided with a reinforcing member extending in a length direction of the vehicle body;
a connecting bracket connecting the side wall of the side sill and the reinforcing member is provided on the reinforcing member; and
the body mounting bracket is coupled to the side wall of the side sill to face the connecting bracket.

11. A vehicle body structure comprising:
a dash cross member extending in a lateral direction of a vehicle body to be coupled to an upper surface of a dash floor and connect A-pillars on either side of the vehicle body;
dash upper side members extending along a curve of the dash floor in a front/rear direction on the upper surface of the dash floor, the dash upper side members coupled to the dash cross member;
dash lower side members spaced apart from the dash upper side members and other on either side across a center of the vehicle body, the dash lower side members extending along the curve of the dash floor in the front/rear direction on the upper surface of the dash floor, the dash upper side members coupled to the dash cross member; and
a lower side member having a front portion coupled to the dash floor across from a portion where the dash cross member, the dash upper side member, and the dash lower side member meet across from the dash floor and a rear portion coupled to a side wall of a side sill.

12. The vehicle body structure of claim 11, further comprising a front side member disposed in front of the dash upper side member such that a force acting rearward through the front side member is transferred to the dash lower side member through the dash upper side member.

13. The vehicle body structure of claim 11, further comprising a body mounting bracket coupled to a frame between a lower side of the lower side member and the side wall of the side sill.

14. The vehicle body structure of claim 13, wherein
the side sill is provided with a reinforcing member extending in the front/rear direction of the vehicle body;
a connecting bracket is provided between an upper side of the reinforcing member and the side wall of the side sill; and
the body mounting bracket is coupled to the side wall of the side sill to face the connecting bracket.

15. The vehicle body structure of claim 13, wherein the upper surface of the dash floor above the body mounting bracket and the lower side member is provided with a dash lower cross extension connecting the A-pillar and the dash lower side member in the lateral direction of the vehicle body.

16. The vehicle body structure of claim 15, wherein the dash lower cross extension, the dash lower side member, and the lower side member form a triangle with each other.

17. The vehicle body structure of claim 16, wherein
a center cross member extending in the lateral direction of the vehicle body to connect side sills on either side is coupled to a lower surface of a body floor extending rearward from the dash floor in a rear of the lower side member, and
a rear-end portion of the dash lower side member is connected to an upper surface of the body floor to face the center cross member.

18. A vehicle body structure comprising:
a dash floor;
a side sill;

a frame;

a dash cross member disposed on an upper surface of the dash floor in a lateral direction of a vehicle;

a lower side member coupled to a lower side of the dash floor to face the dash cross member and coupled to a side wall of the side sill; and a body mounting bracket provided under the lower side member and coupled to the frame.

19. The vehicle body structure of claim 18, further comprising a dash lower cross extension extending in the lateral direction of the vehicle at the upper surface of the dash floor above the body mounting bracket and the lower side member.

20. The vehicle body structure of claim 19, wherein an inboard end portion of the dash lower cross extension is coupled to a dash lower side member disposed away from the center to a side of the vehicle body to extend in a front/rear direction of the vehicle body, and an outboard end portion of the dash lower cross extension is coupled to an A-pillar.

* * * * *